(12) United States Patent
Mazur et al.

(10) Patent No.: US 12,386,344 B2
(45) Date of Patent: Aug. 12, 2025

(54) DATA DRIVEN DIGITAL TWINS FOR INDUSTRIAL AUTOMATION DEVICE OPERATION ENHANCEMENT

(71) Applicant: Rockwell Automation Technologies, Inc., Mayfield Heights, OH (US)

(72) Inventors: David C. Mazur, Mequon, WI (US); Rob A. Entzminger, Shawnee, KS (US); Bruce T. McCleave, Jr., Mission Viejo, CA (US); James M. Teal, New Brunswick, NJ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/543,908

(22) Filed: Dec. 18, 2023

(65) Prior Publication Data
US 2024/0118684 A1    Apr. 11, 2024

Related U.S. Application Data

(63) Continuation of application No. 17/950,586, filed on Sep. 22, 2022, now Pat. No. 11,846,918.

(51) Int. Cl.
*G05B 19/418* (2006.01)
(52) U.S. Cl.
CPC ... *G05B 19/41885* (2013.01); *G05B 19/4186* (2013.01); *G05B 2219/25064* (2013.01)
(58) Field of Classification Search
USPC .......................................................... 703/13
See application file for complete search history.

(56) References Cited

U.S. PATENT DOCUMENTS

| 10,715,388 | B2 | 7/2020 | Fildebrandt et al. |
| 11,182,206 | B2 | 11/2021 | Jung et al. |
| 11,474,873 | B2 | 10/2022 | Biernat et al. |

(Continued)

FOREIGN PATENT DOCUMENTS

| EP | 3696636 A1 | 8/2020 |
| EP | 3979114 A1 | 4/2022 |

(Continued)

OTHER PUBLICATIONS

CN_113268044_A (Year: 2021).*

(Continued)

*Primary Examiner* — Hien D Khuu
(74) *Attorney, Agent, or Firm* — Fletcher Yoder, P.C.

(57) ABSTRACT

An industrial automation system may include a first computing device that may receive operational technology (OT) data from industrial automation devices of an industrial automation system, determine identities of the industrial automation devices based on the OT data, determine that the OT data includes data attributes having variations as compared to additional OT data, transmit the identifiers and the data attributes to a second computing device in response to determining that the data attributions have the variations, receive containers including updated digital representations of the industrial automation devices from the second computing device, execute the containers to output additional data attributes, and send commands to the industrial automation devices to modify processes based the additional data attributes.

18 Claims, 5 Drawing Sheets

(56) References Cited

U.S. PATENT DOCUMENTS

| | | |
|---|---|---|
| 11,513,877 B2 | 11/2022 | Biernat et al. |
| 2007/0078956 A1 | 4/2007 | VanGompel |
| 2017/0220011 A1 | 8/2017 | Hart et al. |
| 2018/0024537 A1 | 1/2018 | Chauvet et al. |
| 2018/0054469 A1 | 2/2018 | Simoncelli |
| 2019/0377604 A1 | 12/2019 | Cybulski |
| 2020/0136906 A1 | 4/2020 | Bernat et al. |
| 2020/0249928 A1 | 8/2020 | Zeng et al. |
| 2020/0278892 A1 | 9/2020 | Nainar et al. |
| 2020/0311617 A1 | 10/2020 | Swan et al. |
| 2021/0089354 A1 | 3/2021 | Nixon et al. |
| 2021/0200814 A1 | 7/2021 | Tal et al. |
| 2021/0218617 A1 | 7/2021 | Palavalli et al. |
| 2021/0271516 A1 | 9/2021 | Hs et al. |
| 2021/0325861 A1 | 10/2021 | Hou et al. |
| 2021/0382727 A1 | 12/2021 | Vigil et al. |
| 2022/0027721 A1 | 1/2022 | Thoemmes et al. |
| 2022/0091572 A1* | 3/2022 | Biernat ............... G05B 19/4188 |
| 2022/0100171 A1* | 3/2022 | Miller ................... G06N 20/00 |
| 2022/0100182 A1* | 3/2022 | Mehrotra ......... G05B 19/41885 |
| 2022/0284096 A1 | 9/2022 | Gadhe |

FOREIGN PATENT DOCUMENTS

| | | | |
|---|---|---|---|
| KR | 20200027783 A | 3/2020 | |
| WO | 2020184362 A1 | 9/2020 | |

OTHER PUBLICATIONS

EP_3748447_A1 (Year: 2020).*

EP_3070550_A1 (Year: 2016).*

Liu, Y. et al., "A Data-Centric Internet of Things Framework Based on Azure Cloud," IEEE Access, vol. 7, Mar. 27, 2019, 20 pages.

Extended European Search Report for European Patent Application No. 21179775.8, dated Nov. 25, 2021, 9 pages.

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-plcfrom-controller-to-cloud-interface , retrieved on Nov. 29, 2021, pp. 1-6.

European Search Report for European Patent Application No. 21180068.5, dated Mar. 28, 2022, 19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022, 12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Hung et al. "A Novel Implementation Framework of Digital Twins for Intelligent Manufacturing Based on Container Technology and Cloud Manufacturing Services", IEEE, Jul. 2022, p. 1614-1630. (Year: 2022).

"What are device templates in Azure IoT Central," Microsoft Learn, https://web.archive.org/web/20221002012l6/https://learn.microsoft.com/en-us/azure/iot-central/core/concepts-device-templates, Aug. 31, 2022, 12 pages.

Lin Ting Yu et al., "Efficient container virtualization-based digital twin simulation of smart industrial systems," Journal of Cleaner Production, Elsevier, Oct. 2, 2020, 19 pages.

Extended European Search Report for Application No. 23198195.2 mailed Feb. 9, 2024, 15 pages.

* cited by examiner

DATA DRIVEN DIGITAL TWINS FOR INDUSTRIAL AUTOMATION DEVICE OPERATION ENHANCEMENT

CROSS REFERENCE TO RELATED APPLICATIONS

This application is a continuation of U.S. patent application Ser. No. 17/950,586, entitled "Data Driven Digital Twins for Industrial Automation Device Operation Enhancement," filed Sep. 22, 2022, that is incorporated herein by reference in the entirety.

BACKGROUND

The present disclosure generally relates to industrial automation device control. More specifically, the present disclosure relates to systems and methods for industrial automation device control using containerized digital representations implemented on edge devices.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

As the industrial automation systems have evolved to harness edge computing, analytics, and the vast amounts of data generated by industrial automation devices, there are continuing interests to find new ways to modify, utilize, and process data. For example, in the case of utilizing edge computing devices to process data generated by industrial automation devices of an industrial automation system, the edge computing devices may be able to reduce the amount of data communicated to a cloud computing system and enhance operations of the industrial automation devices by utilizing containers that are implemented on the edge computing devices.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a first computing device that may receive operational technology (OT) data from one or more industrial automation devices of an industrial automation system, determine one or more identities of the one or more industrial automation devices based on the OT data, determine that the OT data includes one or more data attributes having one or more variations as compared to additional OT data, transmit the one or more identifiers and the one or more data attributes to a second computing device in response to determining that the one or more data attributions have the one or more variations, receive one or more containers including one or more updated digital representations of the one or more industrial automation devices from the second computing device, execute the one or more containers to output one or more additional data attributes, and send one or more commands to the one or more industrial automation devices to modify one or more processes based the one or more additional data attributes.

In another embodiment, a method may include receiving operational technology (OT) data from one or more industrial devices of an industrial system via a first computing device, determining one or more identities of the one or more industrial devices based on the OT data, determining that the OT data includes one or more data attributes having one or more variations as compared to additional OT data, transmitting the one or more identifiers and the one or more data attributes to a second computing device in response to determining that the one or more data attributions have the one or more variations, receiving one or more containers including one or more updated digital representations of the one or more industrial devices from the second computing device, executing the one or more containers to output one or more additional data attributes, and sending one or more commands to the one or more industrial devices to modify one or more processes based the one or more additional data attributes.

In yet another embodiment, computer-readable medium storing instructions that, when executed by one or more processors, cause the one or more processors to perform operations including receiving operational technology (OT) data from one or more industrial devices of an industrial system, determining one or more identities of the one or more industrial devices based on the OT data, determining that the OT data includes one or more data attributes having one or more variations as compared to additional OT data, transmitting the one or more identifiers and the one or more data attributes to a computing device in response to determining that the one or more data attributions have the one or more variations, receiving one or more containers including one or more updated digital representations of the one or more industrial devices from the computing device, executing the one or more containers to output one or more additional data attributes, and sending one or more commands to the one or more industrial devices to modify one or more processes based the one or more additional data attributes.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As digital twin technology becomes more and more prevalent, there are many potential uses for digital twins implemented on industrial automation devices. For example, three dimensional (3D) modeling may be used to create a device level digital twin (e.g., device twin) representing a physical industrial automation device. The device level digital twin may be used to monitor operations of the industrial automation device and simulate operations to identify potential improvement opportunities or issues. However, in certain cases, industrial automation devices may not have computing resources (e.g., memory) to implement device twins and manage or replicate data in the device twins.

In such cases, the device twins corresponding to the industrial automation devices may be executed in a cloud computing environment (e.g., using a cloud computing device or system) and the device twins may be integrated into a system level digital twin representing the industrial automation system. Such cloud-based digital twin implementation may utilize cloud computing resources to support operations of the digital twin. However, certain issues may inhibit the performance of the digital twin. For example, each industrial automation device may send data associated with multiple attributes (e.g., temperature, pressure, speed, orientation, and the like) to the digital twin and the industrial automation system may include a large number (e.g., hundreds, thousands, or more) of industrial automation devices. As a result, a large amount of data may be communicated to the cloud computing device or system. Furthermore, there may be only a small portion of the data including attributes having changes, but the entire digital twin will be updated based on the received data. Such update may cause increased latencies and amount of data communicated to the cloud computing device or system.

With improvements of edge computing, an edge computing device may be used to implement the digital twin representing the industrial automation system described above. Implementing the digital twin on the edge that is closer to the industrial automation devices may reduce response time of the digital twin and communication time. The edge computing device may implement the digital twin by executing a container obtained from a cloud-based computing system containing a container database. The container database may include a collection of containers corresponding to a variety of industrial automation devices (e.g., including devices currently employed and available for future employment in the industrial automation system). Using the container allows the digital twin to be implemented regardless a host environment (e.g., operating system, library dependency) in which the digital twin is operating. The edge computing device may receive data from the industrial automation devices. Instead of sending the data directly to the cloud-based computing system, the edge device may identify those attributes having changes and only communicate the attribute changes to the cloud-based computing system. In this way, the edge computing device may reduce the amount of data communicated within (or out of) the industrial automation system and increase network bandwidth availability.

Embodiments of the present disclosure are generally directed towards an industrial automation system that may utilize an edge computing device to implement a digital representation (e.g., digital twin) of the industrial automation system by executing a software container generated by a cloud-based container orchestration system. The edge computing device may use the digital representation to simulate processes of the industrial automation system. Based on the simulation, the edge device may cause one or more industrial automation devices to modify the processes to facilitate monitoring, operation, optimization, maintenance, and diagnosis of the industrial automation system. Moreover, the edge computing device may dynamically update the digital representation using updated data from the industrial automation devices. For example, the updated data may include an identifier associated with an industrial automation device and attribute values that may indicate potential optimizations or issues associated with the industrial automation devices. The edge device may determine attribute variations based on the updated data and only transmit the attribute variations and the identifier to the container orchestration system. The container orchestration system may query a database based on the identifier to determine a matched digital representation template. The container orchestration system may generate a new container based on the matched digital representation template and customize the new container based on the attribute variations. The new container may be pushed (e.g., from a container registry) to the edge device, which may execute the new container to update the digital representation.

Figure 1:
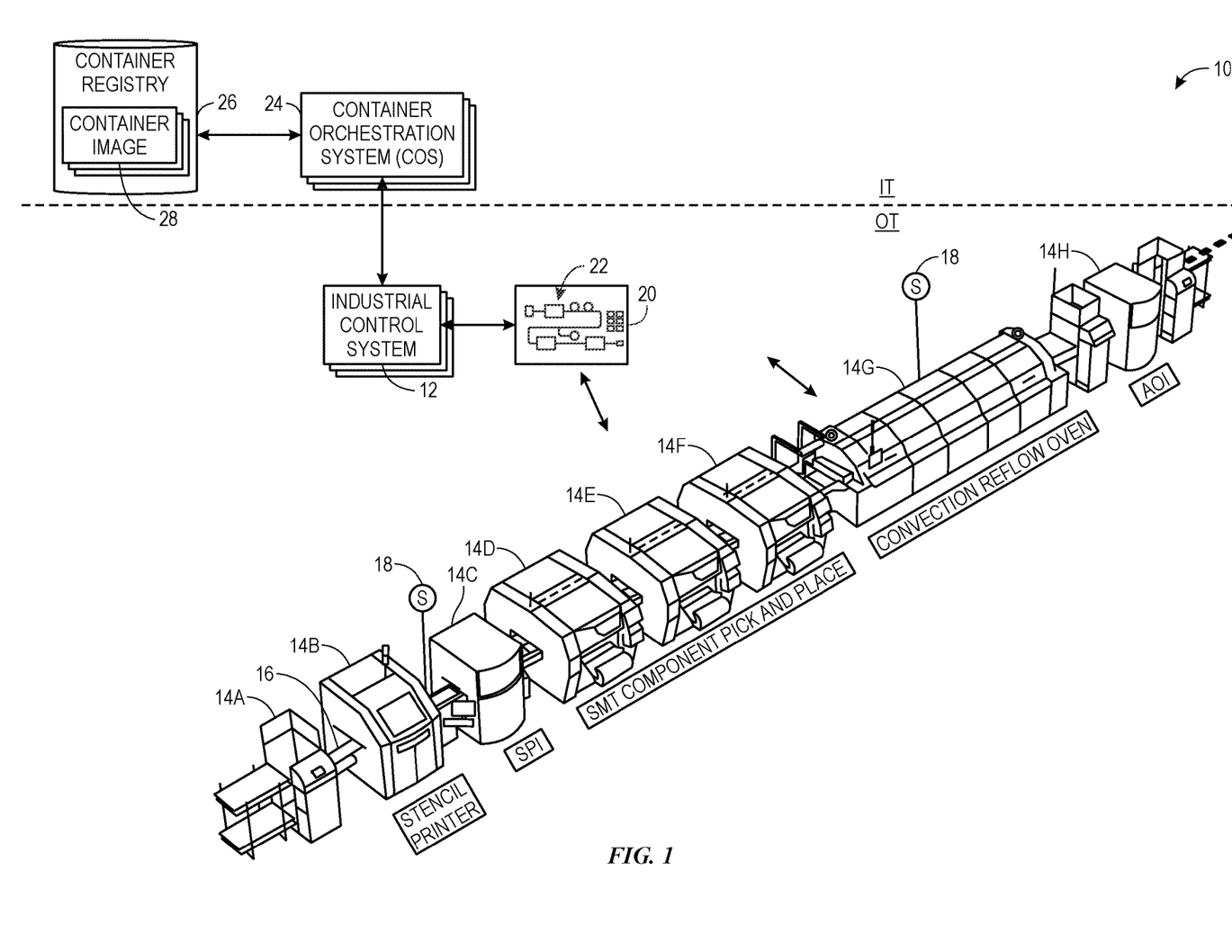
FIG. 1 is a perspective view of an example industrial automation system, in accordance with an embodiment presented herein.

By way of introduction, FIG. 1 is a perspective view of an example industrial automation system 10 controlled by one or more industrial control systems 12. The industrial automation system 10 includes stations 14 having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide digital representations (e.g., digital twins) having simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 (e.g. digital representation with visualizations) of the components of the industrial automation system 10. The industrial control systems 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control systems 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control systems 12. In this way, the OT data may be analog data or digital data indicative of measurements, statuses, alarms, or the like associated with operation of the industrial automation system 10 or the industrial control systems 12.

The industrial control systems 12 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by the industrial control systems 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment (e.g., a cloud computing environment). That is, the container orchestration system 24 may include multiple computing devices (e.g., cloud computing devices) that coordinates an automatic process of managing or scheduling work of individual containers for applications within the multiple computing devices. In other words, the container orchestration system 24 may be used to automate various tasks at scale across the multiple computing devices. By way of example, the container orchestration system 24 may automate tasks such as configuring and scheduling of containers, provisioning and deployments of containers, determining availability of containers, configuring applications in terms of the containers that they run in, scaling of containers to equally balance application workloads across an infrastructure, allocating resources between containers, performing load balancing, traffic routing and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into hosts (e.g., industrial automation devices) that may execute the containers to implement digital representations (e.g., digital twins) of the industrial automation devices. The digital twins may simulate operations of the industrial automation devices and facilitate monitoring, operation, optimization, maintenance, and diagnosis of the industrial automation devices. Furthermore, the container orchestration system 24 may manage the lifecycle of the containers based on predetermined specifications.

It should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. The containers may be easy deploy in different hosts and may not to be rewritten for different implementations. Furthermore, utilizing containers to perform industrial automation processes may reduce the amount of data communicated within (or out of) the industrial automation system 10, thereby potentially decreasing network latency, freeing up bandwidth, or both.

In some embodiments, containers may be stored in a container registry 26 (e.g., a cloud-based container registry) as container images 28. The container registry 26 may be any suitable data storage or database that may be accessible to the container orchestration system 24. The container orchestration system 24 may use the container registry 26 as a container repository to store, distribute, and track the containers. The container image 28 may correspond to an executable software package that includes the tools and data employed to execute a respective application. That is, the container image 28 may include related code for operating the application, application libraries, system libraries, runtime tools, default values for various settings, and the like. For example, the related code may include digital twin code corresponding to an industrial automation device (e.g., motor, protection device, switchgear, or compressor) of the industrial automation system 10. The industrial automation device may receive (e.g., download) a container including the digital twin code. When executing the container, the industrial device may implement the digital twin to simulate processes performed by the industrial automation device. Additionally, the container image 28 may be updated based on certain operational changes (e.g., status, parameters, attributes) associated with the industrial automation device. The industrial automation device may receive an updated container (e.g., including updated code associated with new or improved functions) and update the digital twin by executing the updated container. As such, the digital twin may represent the industrial automation device more accurately throughout the lifecycle of industrial automation device to improve operations of the industrial automation device.

In some cases, certain industrial automation devices (e.g., non-compute-enabled devices) may not have memory or other computing resources to implement digital twins at a device level (referred to as device twins) and properly manage and replicate data in the device twins. In some embodiments, multiple device twins corresponding to the industrial automation devices of the industrial automation system 10 may be integrated or combined into a digital twin at a system level representing the industrial automation system 10. The digital twin may be implemented in an edge computing device that is communicatively coupled to the industrial automation devices. The edge computing device may execute a digital twin container that includes code associated with the digital twin. In some embodiments, the digital twin container may include multiple device twin containers that, when being executed, may simulate the operations of the multiple device twins corresponding to the industrial automation devices in the edge computing device. Such container approach may allow external, non-operation impacting updates to device twin containers without direct updates to the industrial automation devices. Moreover, utilizing containerized edge computing device positioned closer to the industrial automation devices may reduce the timing and amount of data communicated to a cloud computing system (e.g., system managing maintenance for the industrial automation system 10).

Figure 2:
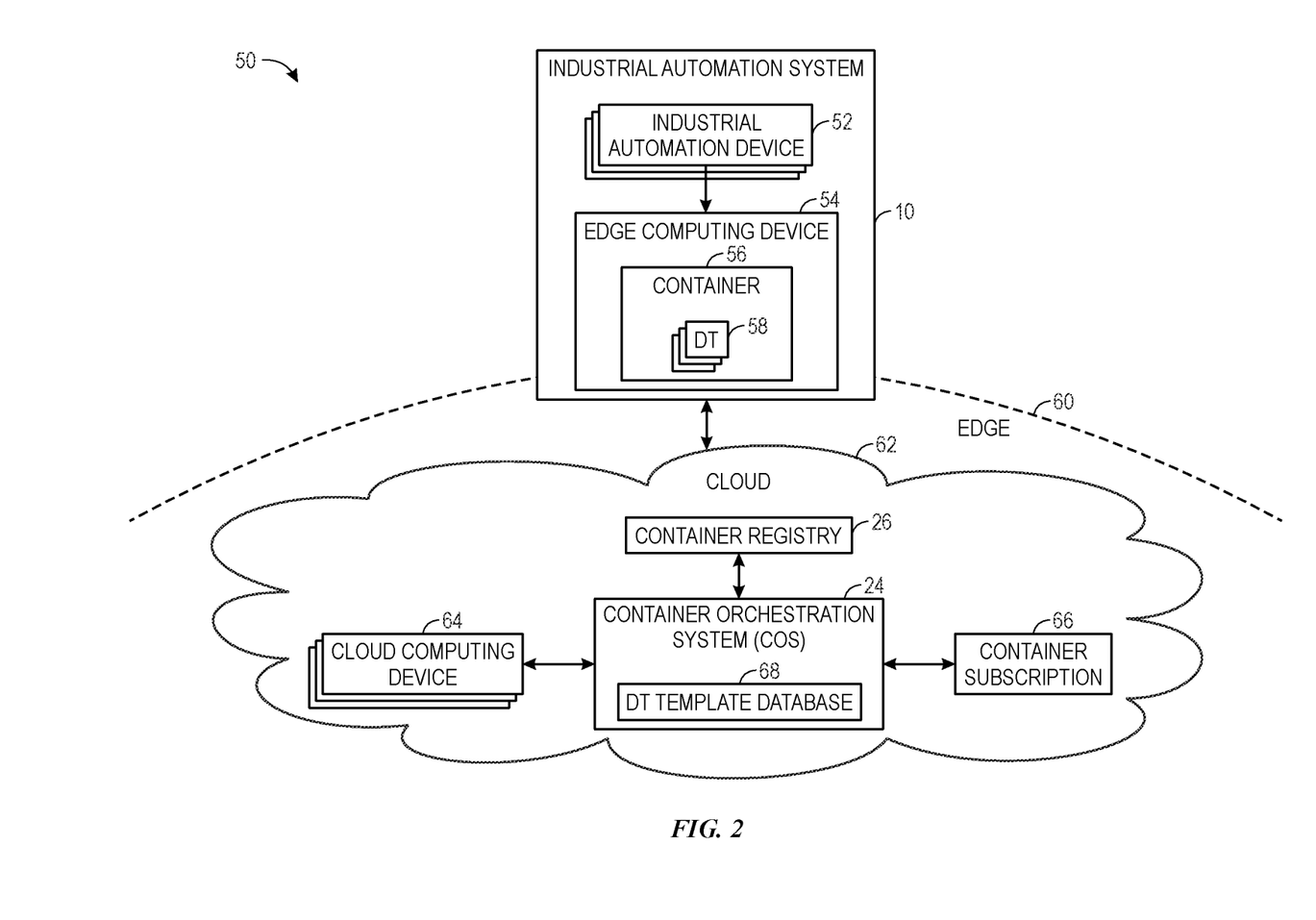
FIG. 2 is a block diagram of an industrial automation device management system that may be used to remotely access the industrial automation system of FIG. 1, in accordance with an embodiment presented herein.

With the foregoing in mind, FIG. 2 is a block diagram of an industrial automation device management system 50 that may be used to remotely access the industrial automation system 10 of FIG. 1. The industrial automation device management system 50 includes industrial automation devices 52 of the industrial automation system 10, such as motor, sensors, protection device, switchgear, compressor, controllers, and so on. The industrial automation devices 52 may communicatively couple to an edge computing device 54 (e.g., a drive) located at an edge 60 of a cloud 62 (e.g., an industrial network). The edge computing device 54 may include a container 56 (e.g. a software container). One or more digital twins 58 may be implemented within the container 56. The digital twins 58 may be virtual instances (e.g., digital representations) of the industrial automation system 10. The digital twins 58 may provide flexible ways in which the edge computing device 54 may be implemented to monitor and control the industrial automation system 10. In some embodiment, each of the digital twins 58 may represent one aspect (e.g., thermal, kinetic, pressure, acoustic, or power aspect) of the industrial automation system 10, The cloud 62 may be implemented by a variety of computing devices (e.g., cloud computing devices 64), storage devices, and connecting devices (e.g., routers, switches, gateways). The industrial automation device management system 50 may use the cloud 62 to facilitate communication between the industrial automation devices 52, the edge computing device 54, the container orchestration system 24, and other relevant systems or components. The cloud 62 may include one or more wired or wireless networks, including, but not limited to, local area networks (LANs), wide area networks (WANs), wireless WANs (WWANs), wireless LANs (WLANs), mobile communications networks (e.g., 3G, 4G, 5G, Edge, etc.), and so forth. For example, an asset management system may use a local area network (LAN) that includes a variety of computing and network devices including, but not limited to, switches, servers (e.g., processors), storage (e.g., memory), and routers. The above-mentioned systems/devices may communicate with each other using a variety of communication protocols, such as Open Database Connectivity (ODBC), TCP/IP Protocol, Distributed Relational Database Architecture (DRDA) protocol, Database Change Protocol (DCP), HTTP protocol, Bluetooth, Wi-Fi, Near Field Communication (NFC), other suitable current or future protocols, or combinations thereof.

As illustrated, the cloud 62 includes the container orchestration system 24, the container registry 26, the cloud computing devices 64, and a container subscription component 66. The container orchestration system 24 may include a digital twin template database 68 that stores various digital twin templates (e.g., Digital Twin Definition Language (DTDL) templates) associated with the industrial automation system 10 and the components (e.g., the industrial automation devices 52) of the industrial automation system 10. The DTDL may be used to create a container, when executed by a computing device (e.g., edge computing device 54), implement a digital representation (e.g., digital twin 58) of real-world things, places, and industrial or business processes, and the like. As such, the DTDL may include data structures, functions, expected inputs, expected outputs, and other elements for generating the digital representation. The digital representation may output insights that may lead to better products, optimize operations and costs, create breakthrough user experiences, and so on. In some embodiments, digital twin templates may correspond to certain aspects of the industrial automation system 10 at the system level, and other digital twin templates may correspond to the industrial automation devices 52 at the device level. The container orchestration system 24 may use the container subscription component 66 to provide a container subscription/publication service for the edge computing device 54. The container subscription/publication service may include periodical monitoring the container registry 26 to identify a new or updated container and sending a notification to prompt the edge computing device 54 to receive the new or updated container. Each of the container orchestration system 24, the container registry 26, the cloud computing devices 64, and the container subscription component 66 may include one of more processors of the computing devices that may execute computer-readable instructions stored on memory/storage devices of the computing devices.

In some embodiments, the container orchestration system 24 may collect information associated with the industrial automation system 10 during an initialization stage (e.g., a testing stage of the industrial automation system 10). For instance, the container orchestration system 24 may collect the operational technology (OT) data (e.g., regarding operation, status, configuration, specification, operational modes) from the industrial automation devices 52 via the edge computing device 54. The OT data may include OT datasets each generated from a specific device of the industrial automation devices 52. Each OT dataset may include a unique dataset identifier associated with a corresponding device of the industrial automation devices 52.

Based on received OT datasets (e.g., using dataset identifiers), the container orchestration system 24 may query the digital twin template database 68 to retrieve digital twin templates corresponding to the dataset identifiers. The digital twin templates may include information related to the types of devices and equipment that are specified by the OT datasets. That is, the OT datasets may indicate a number of industrial automation devices 52 that may be present, the types of the industrial automation devices 52, the operational parameter data (e.g., control settings) for each of the industrial automation devices 52, the function of each of and the entire fleet of the industrial automation devices 52, and the like. The container orchestration system 24 may then generate individual device twin containers based on the digital twin templates and other relevant information (e.g., configuration, specification, or mode) in the OT dataset. For example, the container orchestration system 24 may generate initial code for a device twin container associated with a specific device based on a digital twin template corresponding to a type of device that include the specific device. Next, the container orchestration system 24 may customize the initial code using the relevant information that may include specific (e.g., unique) details regarding the specific device. Each device twin container may include a unique container identifier correlated with the unique dataset identifier associated with the corresponding device. The container orchestration system 24 may utilize mappings (e.g., in a mapping file) to identify the correlations between dataset identifiers and container identifiers associated with different industrial automation devices 52.

In some embodiments, the container orchestration system 24 may integrate the individual device twin containers into a system-level digital twin container representing the industrial automation system 10 at the system level. The container orchestration system 24 may utilize one or more system files (e.g., configuration files) that include information related to a scope (e.g., aspect) represented by the system-level digital twin container, information detailing relations between the scope and other scopes (e.g., aspects) of the industrial automation system 10, information detailing relations between the system-level digital twin container and the device twin containers, and information detailing relations between the individual device twin containers, and the like. The container orchestration system 24 may store the device twin containers, the system-level digital twin container, and the configuration files into the container registry 26.

In some embodiments, the container orchestration system 24 may cause the container registry 26 to push a copy of the digital twin container (e.g., container 56) to the edge computing device 54. After receiving the container 56, the edge computing device may execute the container 56 to implement a digital twin representing the industrial automation system 10 (e.g., with respect to thermal aspect of the industrial automation system 10). The processes described above may continue as the operations of the industrial automation system 10 continue, thereby implementing more digital twins (e.g., representing other aspects, such as) that become part of the digital twins 58.

Although FIG. 2 is depicted with respect to the industrial automation device management system 50, it should be understood that the components described with respect to FIG. 2 are exemplary figures and the industrial automation device management system 50 may include additional or fewer components as detailed above. For instance, each of the container orchestration system 24, the container registry 26, the edge computing device 54, the cloud computing devices 64, and the container subscription component 66 may include one or more databases.

Figure 3:
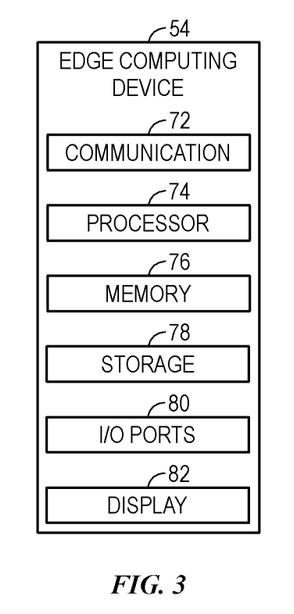
FIG. 3 a block diagram of an example edge computing device with containers that may be used in the industrial automation device management system of FIG. 2, in accordance with an embodiment presented herein.

FIG. 3 a block diagram of an example edge computing device (e.g., edge computing device 54) with containers that may be used in the industrial automation device management system 50 of FIG. 2. The edge computing device 54 may include a communication component 72, a processor 74, a memory 76, a storage 78, input/output (I/O) ports 80, a display 80, and the like. The communication component 72 may be a wireless or wired communication component that facilitates communication between the container orchestration system 24 and the edge computing device 54, or any other suitable systems, components, or devices. The processor 84 may be any type of computer processor or microprocessor capable of executing computer-executable code. The processor 84 may also include multiple processors each including processing circuitry that may perform the operations described below.

The memory 86 and the storage 88 may be any suitable article of manufacture that may serve as media to store processor-executable code, containers (e.g., container 56) data (e.g. OT data), or the like. These articles of manufacture may represent computer-readable media (i.e., any suitable form of memory or storage) that may store the processor-executable code used by the processor 84 to perform the presently disclosed techniques. The memory 86 and the storage 88 may represent non-transitory computer-readable media (e.g., any suitable form of memory or storage) that may store the processor-executable code used by the processor 84 to perform various techniques described herein. It should be noted that non-transitory merely indicates that the media is tangible and not a signal.

The I/O ports 80 may couple to one or more sensors 18, one or more input devices, one or more displays, or the like to facilitate human or machine interaction with the industrial automation system 10. For example, based on a notification provided to a user via the display 82, the user may use an input device to instruct certain adjustments of one or more of the industrial automation devices 52 of the industrial automation system 10.

The display 82 may operate to depict visualizations associated with software (e.g., containers) or executable code being processed by the processor 84. In one embodiment, the display 82 may be a touch display capable of receiving inputs from a user (e.g., operator) of the industrial automation system 10. The display 82 may be any suitable type of display, such as a liquid crystal display (LCD), plasma display, or an organic light emitting diode (OLED) display, for example. Additionally, in one embodiment, the display 82 may be provided in conjunction with a touch-sensitive mechanism (e.g., a touch screen) that may function as part of a control interface for the industrial automation system 10.

Although FIG. 3 is depicted with respect to the edge computing device 54, it should be noted that other computing systems (e.g., the container orchestration system 24) or devices may also include the same or similar components to perform, or facilitate performing, the various techniques described herein. Moreover, it should be understood that the components described with respect to FIG. 3 are exemplary figures and the edge computing device 54 and other suitable computing systems or devices may include additional or fewer components as detailed above.

Figure 4:
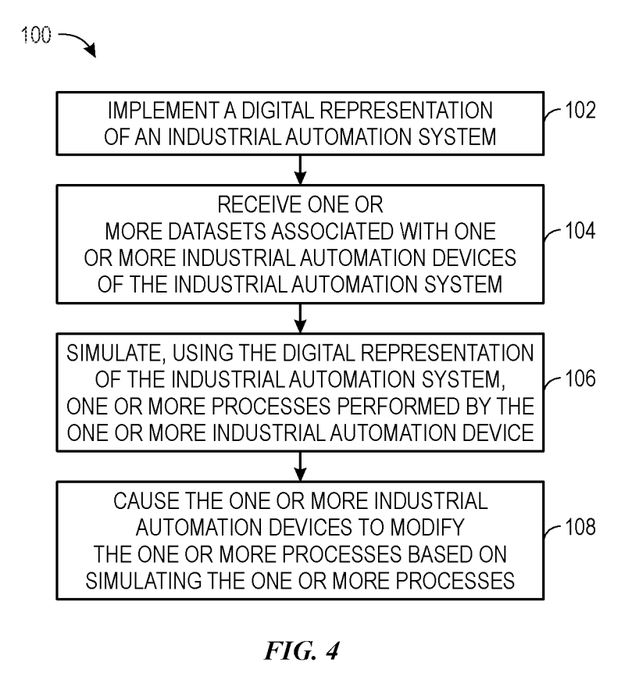
FIG. 4 is a flow diagram of a process for operating a digital representation of the industrial automation system of FIG. 1 using the edge computing device of FIG. 3, in accordance with an embodiment presented herein.

With the foregoing in mind, FIG. 4 is a flow diagram of a process 100 for operating a digital representation of the industrial automation system 10 of FIG. 1 using the edge computing device 54 of FIG. 3. The process 120 may be performed by the edge computing device 54 using processing circuitry (e.g. the processor 74 included in the edge computing device 54) executing computer-readable instructions stored on memory or storage (e.g., the memory 76 or storage 78) of the edge computing device 54.

Although the process 100 described in FIG. 4 is described in a particular order, it should be noted that the process 100 may be performed in any suitable order and is not limited to the order presented herein. It should also be noted that although each processing block is described below in the process 100 as being performed by the edge computing device 54, other suitable devices may perform the methods described herein.

Referring now to FIG. 3, at block 102, the edge computing device 54 may implement a digital representation (e.g., digital twin 58) of the industrial automation system 10. For example, the edge computing device 54 may receive (e.g., download) a container (e.g., container 56) from a cloud-based container registry (e.g., container registry 26). In some embodiments, the computing device 54 may receive the container using a cloud-based container subscription service (e.g. provided by the container subscription component 66). For instance, the container subscription component 66 may continuously or periodically (e.g., every day, every 3 days, every week, or every month) monitor the container registry 26 to identify whether a new container or an updated version of an existing container is available. The container subscription component 66 may send a notification indicative of the new or updated container to the edge computing device 54 to prompt the edge computing device 54 to receive the new or updated container.

The received container may include a set of device twin code corresponding to individual industrial automation devices (e.g., industrial automation devices 52) at a device level to represent the operations of the respective industrial automation devices. When executing the set of device twin code, the edge computing device 54 may implement a set of device twins, each device twin representing a corresponding industrial automation device of the industrial automation system 10. The edge computing device 54 may utilize each individual device twin to simulate various operations (e.g., parameter setting, operation mode, fault identification, maintenance, troubleshooting) of each corresponding industrial automation device at the device level.

The received container may also include a digital twin code corresponding to the industrial automation system 10 at a system level. When executing the digital twin code, the edge computing device 54 may integrate the set of device twins into the digital twin 58 representing the industrial automation system 10. The digital twin 58 may include hierarchical levels of the industrial automation system 10, such as information related to an aspect (e.g., thermal aspect) represented by the digital twin 58, relations between the aspect and other aspects (e.g., kinetic, pressure, acoustic, and power aspects) of the industrial automation system 10, relations between the digital twin 58 and the device twins, and relationships between the device twins, and the like.

The digital twin 58 may also include data structures (e.g., predetermined data structures) regulating procedures and formats used to process OT data (e.g., data received from the industrial automation devices 52). For example, the digital twin 58 may have functions to manage data reception and transmission (e.g., filtering the OT data and only transmitting certain portions of the OT data to the container orchestration system 24), format or convert the received OT data into a standard data format based on the predetermined data structures that may be shared by each device twin, setup input/output ports for each device twin based on the hierarchical levels of the industrial automation system 10 to facilitate data communication between the device twins within the digital twin 58, and so on.

Furthermore, the digital twin 58 may include a variety of computational algorithms to facilitate data analysis and processing using the OT data received from the industrial automation device 52. For example, the computational algorithms may include machine learning algorithms and/or artificial intelligence algorithms. The digital twin 58 may utilize the OT data and apply the machine learning algorithms to identify correlations, trends, patterns, potential issues, and other properties associated with individual industrial automation devices 52 and/or the industrial automation system 10. In some embodiments, the digital twin 58 may include one or more models (e.g., mathematic models) that may be used to simulate various operations (e.g., parameter setting, operation mode, fault identification, maintenance, troubleshooting, and so on) of the industrial automation system 10. For example, the digital twin 58 may perform a machine learning process and generate a mathematical model based on a sample of the clean data, known as "training data," in order to make predictions or decisions without being explicitly programmed to perform the task.

After the digital twin 58 is implemented (e.g., downloaded and executed) in the container (e.g., container 56), at block 104, the edge computing device 54 may receive one or more datasets associated with one or more industrial automation devices (e.g., industrial automation device 52) of the industrial automation system (e.g., industrial automation system 10). For example, each of the one or more datasets may be generated from a specific industrial automation device 52 and may include a unique dataset identifier associated with that specific industrial automation device 52. The one or more datasets may include the OT data, such as operational parameters, operational status, controller reading, sensor data, operational modes, alarm conditions, and so on. In some embodiments, the edge computing device 54 may format or convert the one or more datasets into the standard data format that may be shared by each device twin and setup input/output ports for each device twin to facilitate a distribution of the one or more datasets between the device twins.

At block 106, the industrial automation device 52 may simulate, using the digital representation (e.g., digital twin 58) of the industrial automation system 10, one or more processes performed by the one or more industrial automation devices 52. For example, the edge computing device 54 may use the digital twin 58 to run simulations related to the one or more processes, such as operation performance analysis, diagnostics for existing issues, prediction for potential problems, and the like. The digital twin 58 may run the simulations based on the one or more datasets received from the one or more industrial automation devices 52 and other relevant data (e.g., historical data) associated with the one or more industrial automation devices 52. In some embodiments, the digital twin 58 may identify relevant devices of the industrial automation devices 52 (e.g., based on the one or more datasets that may include certain identifiers associated with relevant devices), and cause relevant device twins corresponding to the relevant devices to run simulations at the device level. Furthermore, the digital twin 58 may receive device twin simulation result and run simulations at the system level based on the device twin simulation result. The edge computing device 54 may also use the digital twin 58 to analyze the simulation result (e.g., using the machine learning algorithms and/or artificial intelligence algorithms). For instance, the one or more processes may include process for optimize conveyor speeds of machine conveyors of a mechanized assembly line. The digital twin 58 may receive speed simulations (e.g., increasing speeds by 10% from current speeds) result from device twins corresponding to the machine conveyors and use the result as input to run a simulation to determine whether the increased speeds of the machine conveyors may overload the mechanized assembly line.

Executing digital twins (e.g., digital twin 58) on edge devices (e.g., edge computing device 54) may provide various advantages for operating industrial systems (e.g., industrial automation system 10) using vast amount of OT data, advanced edge computing resources (e.g., fast data processing, prompt device control), and abundant cloud computing and storage resources. In some cases where one or more industrial systems may be integrated to form a sophisticated system (e.g., an automated manufacturing system), the system may include a great number of industrial automation devices and sensors that may produce vast amount of OT data. With certain limitations (e.g., limited connectivity), sending such large amount of data to digital twins executed on cloud computing systems/device may cause data communication latency and delayed response time. In contrast, using digital twins on the edge devices may enable data processing locally (e.g., close to the data sources) for more efficient processing and analysis to trigger real-time responses, thereby increasing network bandwidth to cloud computing devices and other network devices.

The edge-based digital twins may also deliver fast analytics (e.g., identifying potential issues based on simulations), quick solution (e.g., to identified issues), and prompt commands to related devices (e.g., to adjust operations to solve the identified issues). Moreover, the edge-based digital twins may regulate data communications such that a limited amount of OT data is transmitted to the cloud computing systems/devices. In this way, the cloud computing systems/devices may focus on larger scaled data collection (e.g., collecting data from other relevant industrial systems), data mining, advanced simulations based on transmitted OT data from the automated manufacturing system and other relevant data (e.g., historical data and/or synthetic data from other industrial systems related (e.g., similar, upstream, downstream) to the automated manufacturing system), and the like. Furthermore, using containerized digital twins implemented on edge devices may allow fast and convenient deployment (e.g., with reduced coding, less dependency on running environment) of digital twins in new places where there is limited computing resources (e.g., limited memory and/or data processing capabilities associated with certain industrial devices) and/or network connectivity, or where there are industrial devices having different running environment (e.g., operating systems or libraries from different vendors).

Additionally, using containerized digital twin implemented on edge devices may improve network security. For instance, certain sensitive OT data associated with the industrial automation system 10 may be stored locally on the edge computing device 54. In some cases, the OT data may be encrypted (e.g., adding meta-data) by the edge computing device 54 using the digital twin 58 such that only the encrypted OT data is transmitted to the cloud computing systems/devices.

At block 108, the edge computing device 54 may cause the one or more industrial automation devices 52 to modify the one or more processes based on simulation data. In the example process of optimizing conveyor speeds as described above, the digital twin 58 may determine that increasing speeds by 10% from current speeds of the machine conveyors will not overload the mechanized assembly line based on speed simulation result. As such, the edge computing device 54 may cause (e.g., by sending commands to conveyor controllers) motors of the machine conveyors to increase speeds (e.g., by 10% from current speeds).

After a digital representation (e.g., digital twin 58) of an industrial system (e.g., industrial automation system 10) is implemented on a computing device (e.g., the edge computing device 54), the digital representation may be updated when the industrial system has certain changes and/or updates. For example, the computing device may receive data indicating new aspect(s) of the industrial system, new device(s) or component(s) of the industrial system, new or updated firmware(s) of the industrial system, and so on. In response to the changes and/or updates, the computing device may receive new container(s) corresponding to such changes and implement an updated digital representation by executing the new container(s). The updated digital representation may represent the changed or updated industrial system.

Figure 5:
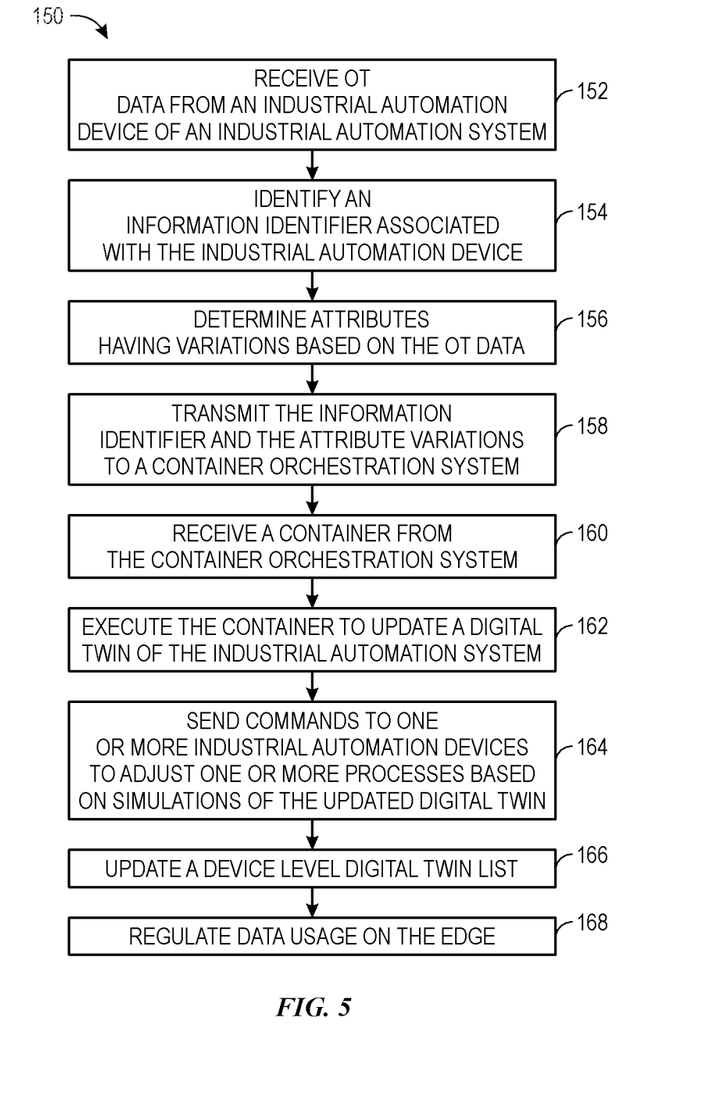
FIG. 5 is a flow diagram of a process for dynamically updating the digital representation of the industrial automation system of FIG. 1 based on a container executed within an edge device, in accordance with an embodiment presented herein.

With the proceeding in mind, FIG. 5 is a flow diagram of a process 150 for dynamically updating the digital representation (e.g., digital twin 58) of the industrial automation system 10 of FIG. 1 based on a container (e.g., container 56) executed within an edge device (e.g., edge computing device 54). The process 150 may be performed by the edge computing device 54 using processing circuitry (e.g. the processor 74 included in the edge computing device 54) executing computer-readable instructions stored on memory or storage (e.g., the memory 76 or storage 78) of the edge computing device 54.

Although the process 150 described in FIG. 5 is described in a particular order, it should be noted that the process 150 may be performed in any suitable order and is not limited to the order presented herein. It should also be noted that although each processing block is described below in the process 150 as being performed by the edge computing device 54, other suitable devices may perform the methods described herein.

Referring now to FIG. 5, at block 152, the edge computing device 54 may receive OT data from an industrial automation device (e.g., industrial automation device 52) of an industrial automation system (e.g., industrial automation system 10). The OT data may include operational parameters, operational status, operational modes, and so on. The OT data may be generated directly from the industrial automation device 52, a control device (e.g., device controller) communicatively coupled to the industrial automation device 52, one or more sensors (e.g., sensing temperature, pressure, speed, distance, vibration, and the like) communicatively coupled to the industrial automation device 52, or any combination thereof. Based on receive OT data, at block 154, the edge computing device 54 may identify an information identifier associated with the industrial automation device. For instance, the OT data generating device (e.g., the industrial automation device 52, device controller, or sensors) may add the information identifier into the OT data. The information identifier may include information related to a device identifier (e.g., model number, serial number, Media Access Control (MAC) address, or the like) of the industrial automation device 52, and other relevant information (e.g., timing/location information indicating when/where the OT data is generated). The edge computing device 54 may perform a namespace reading and identify the information identifier embedded in the OT data. A namespace may be referred to as a set of elements (e.g., signs) used to identify objects of various types. Using the namespace allows all of a given set of objects have unique identifiers so that they can be easily identified. Namespaces may be structured based on hierarchy information (e.g., hierarchical levels of the industrial automation system 10 stored in the digital twin 58) to allow reuse of identifiers in different contexts. The edge computing device 54 may determine one or more identifiers by retrieving one or more namespace elements associated with one or more industrial devices via the OT data. The one or more namespace elements may correspond to one or more model numbers, one or more serial numbers, one or more Media Access Control (MAC) addresses, or any combination thereof associated with the one or more industrial devices.

At block 156, the edge computing device 54 may determine attributes having variations based on the received OT data and expected OT data determined based on a container executing a digital twin of the industrial automation device. For example, the OT data may include data related to a certain amount (e.g., 200) of attributes (e.g., temperature, pressure, speed, distance, vibration, and the like) associated with the industrial automation device 52. However, the edge computing device 54 may determine (e.g., using the digital twin 58) that only a portion of the attributes (e.g., 50 attributes) have variations (e.g., changed values or modes), for example, when comparing to expected data outputs provided by the digital twin 58 that is related to the industrial automation device 52. Furthermore, the edge computing device 54 may determine each variation (e.g., temperature change) associated with the portion of the attributes.

At block 158, the edge computing device 54 may transmit the information identifier and the attribute variations to a container orchestration system (e.g., container orchestration system 24). For example, the edge computing device 54 may create a dataset to include the information identifier and the attribute variations (e.g., temperature change $\Delta T$, instead of the temperature values related to $\Delta T$, such as $T_{Present}$ and $T_{History}$) based on the predetermined hierarchical levels and data structures of the industrial automation system 10. In some embodiments, the edge computing device 54 may convert or transform the dataset into metadata in a predetermined data format that may include additional data (e.g., contextual data (e.g., data history) related to the industrial automation device 52). In this way, the timing and amount of data communicated to a cloud computing system (e.g., container orchestration system 24) may be reduced.

At block 160, the edge computing device 54 may receive a container from the container orchestration system 24. For example, the container may include new code corresponding to a new device twin representing the industrial automation device 52 that is identified (e.g., by the container orchestration system 24) as a new device, or updated code corresponding to an existing device twin representing the industrial automation device 52 that has been identified in the past. The new code or the updated code may include new or updated functions that can be added to the digital twin 58 to enable or improve operational control, parameter setting, fault identification, maintenance, and troubleshooting associated with the industrial automation device 52.

After receiving the container, at block 162, the edge computing device 54 may execute the container to update the digital twin 58 of the industrial automation system 10. For example, the update may include creating a new device twin, updating one or more existing device twins (e.g., representing the industrial automation device 52 and other devices related to the industrial automation device 52), updating the digital twin 58 at the system level, and so forth. The updated digital twin 58 with new/updated functions may provide a more accurate representation of the industrial automation system 10 (e.g., in response to determined attribute variations that may indicate potential optimizations or issues). For example, the updated digital twin 58 may output one or more additional data attributes indicative of new features of the industrial automation system 10.

Using the updated digital twin 58, the edge computing device 54 may run new simulations based on the OT data and other relevant data (e.g., historical data, synthetic data). At block 164, the edge computing device 54 may send commands to one or more industrial automation devices to adjust one or more processes based on new simulations of the updated digital twin 58. Adjusting the one or more processes may facilitate operational control, parameter setting, fault identification, maintenance, and troubleshooting associated with the industrial automation device 52.

At block 166, the edge computing device 54 may update a device level digital twin list. For example, the update may include adding a new device twin (e.g., with a device twin identifier) into the device level digital twin list created previously and stored in the digital twin 58. In some embodiments, the device level digital twin list may be associated with a namespace that may be updated accordingly. The namespace may be used to identify the information identifier associated with the industrial automation device 52, as described at block 154.

Additionally, at block 168, the edge computing device 54 may regulate data usage on an edge (e.g., edge 60). In one embodiment, the edge computing device 54 may receive an indication (e.g., from an operator) that certain aspects of the industrial automation system 10 or certain devices are no longer used. As such, the edge computing device 54 may query a database (e.g., stored in the memory 76 or storage 78) and identify target datasets based on certain identifiers (e.g., information identifiers) associated with the aspects or devices. The edge computing device 54 may remove the target datasets from the database.

Figure 6:
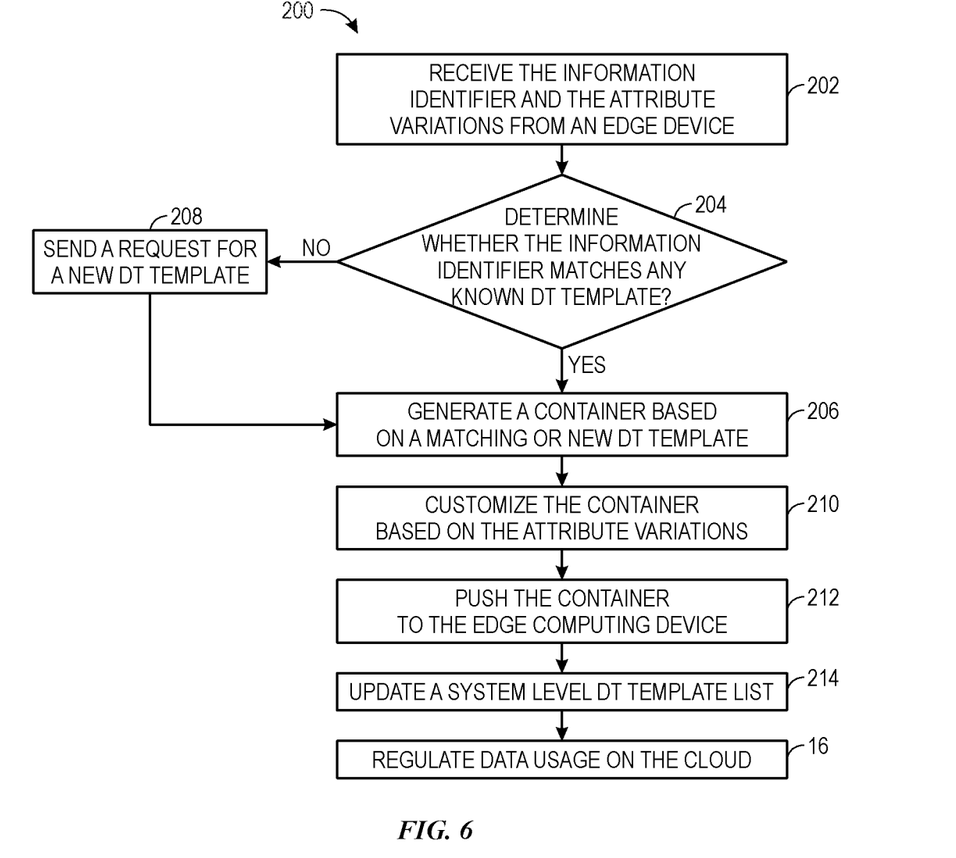
FIG. 6 is a flow diagram of a process for dynamically generating a container based on operational technology (OT) data via a cloud computing system, in accordance with an embodiment presented herein.

The process 150 described above with respect to FIG. 5 is related to operations performed by the edge computing device 54. Such operations may be correlated or coordinated with corresponding operations performed by a cloud-based management system (e.g., container orchestration system 24). FIG. 6 is a flow diagram of a process 200 for dynamically generating a container based on operational technology (OT) data via a cloud computing system (e.g., container orchestration system 24). The process 200 may be performed by the container orchestration system 24 using processing circuitry (e.g. one or more processors included in the cloud computing devices 64) executing computer-readable instructions stored on memory or storage of the cloud computing devices 64.

Although the process 200 described in FIG. 6 is described in a particular order, it should be noted that the process 200 may be performed in any suitable order and is not limited to the order presented herein. It should also be noted that although each processing block is described below in the process 200 as being performed by the container orchestration system 24, other suitable systems may perform the methods described herein.

Referring now to FIG. 6, at block 202, the container orchestration system 24 may receive the information identifier and the attribute variations from the edge computing device 54. Based on the information identifier, at block 204, the container orchestration system 24 may determine whether the information identifier matches any known digital twin (DT) template. For example, the container orchestration system 24 may query a database (e.g., the digital twin template database 68) storing digital twin templates corresponding to previously identified industrial automation devices 52 and any potentially available/implementable devices of the industrial automation system 10. The digital twin templates may be created by a computing device (e.g. a server) using certain computing languages (e.g., Digital Twin Definition Language (DTDL)) based on information associated with the corresponding devices, such as specifications, parameters, relevant data (e.g., historical data, synthetic data), mathematic models, and so on. Each digital twin template may include a template identifier related to an identification (e.g., device identifier) associated with a corresponding industrial automation device 52 represented by a digital twin implemented based on the digital twin template. In one embodiment, the container orchestration system 24 may use a database server to search available template identifiers based on the device identifier to identify a digital twin template having a template identifier in match with (e.g., based on a mapping) the information identifier. For example, the database may store the mapping indicating relationships between the information identifiers and the device identifiers, as well as relationships between the device identifiers and the template identifiers.

In response to determine that the information identifier matches a digital twin template stored in the database, at block 206, the container orchestration system 24 may generate a container based on the matching digital twin template. For example, the container orchestration system 24 may convert the digital twin template to the container using certain computing languages (e.g., software containerization languages). The container may include code and code dependencies that allow digital twin implemented using the container to run in any environment (e.g., operating system) consistently and reliably. Using the container orchestration system 24 to manage digital twin template and container operations (e.g., collecting and storing templates, creating containers based on templates) on the cloud 62 may take advantage of the cloud computing. For example, container orchestration system 24 may have access to a number of different edge computing devices coupled to different industrial systems operated by different entities. The container orchestration system 24 may also have access to cloud-based computing systems/devices that may perform large scale data collection, data mining, advanced simulations based on collected data, and container creation/update based on advance simulations, and the like. As such, the container orchestration system 24 may provide an up-to-date digital twin template database that may be used to determine a particular template matching newly identified industrial automation device.

In response to determining that the information identifier does not matches any digital twin template stored in the database, at block 208, the container orchestration system 24 may send a request for a new digital twin template to another computing device (e.g., server associated with a digital twin template developer). The request may include information related to the requested template, such as device specifications, parameters, relevant data (e.g., historical data, synthetic data), mathematic models, and so on. The computing device may send the new digital twin template to the container orchestration system 24 after a template development process. At block 206, the container orchestration system 24 may generate a container based on the new digital twin template.

At block 210, the container orchestration system 24 may customize the container generated at block 206 based on the attribute variations. For example, the container may include basic functions executable by the digital twin to be updated based on the container. The container orchestration system 24 may customize the container to include new functions associated with the attribute variations that may indicate potential optimizations or issues of the industrial automation system 10. For instance, the container may include a speed control function allow a corresponding digital twin (e.g. when implemented using the container) to regulate motors of the industrial automation system 10 to maintain the speeds within a predetermined range. However, the attribute variations may include temperature variations at certain given speeds that may indicate (e.g., based on simulations using the cloud computing device 64) that generated heat from the motors operating at or above a specific speed may exceed a cooling capacity of the industrial automation system 10. As such, the container orchestration system 24 may add a new function that allow the digital twin to be updated to cause a cool system to adjust cooling capacity (e.g., by enabling backup cooling unit).

In some embodiments, the container generated at block 206 may be created by a first party by modifying another container developed by a second party. In this way, an entity (e.g., a factory) may integrate different digital twins based on different containers developed by different parties, thereby reducing the time for developing new containers.

At block 212, the container orchestration system 24 may push the container to the edge computing device 54. For example, the container orchestration system 24 may store the container in the container registry 26. The container registry 26 may update a container list to include the container generated at block 206. The container orchestration system 24 may use the container registry 26 to store, distribute, and track the container. In some embodiments, a container image (e.g., the container image 28) may be created to include code related to executing the container, such as libraries, tools, runtime variables, and the like. In some embodiments, the container subscription component 66 may be used to send a notification indicative of the container to the edge computing device 54 to prompt the edge computing device 54 to receive the container.

After pushing the container to the edge computing device 54, at block 214, the container orchestration system 24 may update a system level digital twin template list. For instance, the digital twin template database 68 may include the system level digital twin template list. When determining that the information identifier does not matches any digital twin template stored in the digital twin template database 68 (at block 204), the container orchestration system 24 may add information (e.g., digital twin template identifier) associated with the new digital twin template into the system level digital twin template list.

Additionally, the container orchestration system 24 may manage data usage on a cloud (e.g., cloud 62). In one embodiment, the container orchestration system 24 may determine that certain digital twins are no longer used (e.g., based on data consumptions), thereby removing digital twin templates related to such digital twins from the digital twin template database 68. Moreover, the container orchestration system 24 may send a request to the edge computing device 54 to remove such digital twins from corresponding containers where the digital twins implemented, and data related to such digital twins from the database.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing device comprising processing circuitry configured to:
receive one or more containers configured to simulate a plurality of digital representations corresponding to a plurality of industrial automation devices of an industrial automation system;
receive operational technology (OT) data from the plurality of industrial automation devices, wherein a portion of the OT data comprises:
an identifier associated with a first industrial automation device of the plurality of industrial automation devices, wherein the identifier comprises an indication of a second industrial automation device of the plurality of industrial automation devices associated with the first industrial automation device;
simulate, using the one or more containers, a first digital representation of the plurality of digital representations corresponding to one or more simulated operations of the second industrial automation device at a device level based on an additional portion of the OT data associated with the second industrial automation device;
simulate, using the one or more containers, a second digital representation of the plurality of digital representations corresponding to one or more processes performed by the plurality of industrial automation devices at a system level to generate one or more simulated processes, wherein the second digital representation is simulated based on the OT data and the one or more simulated operations;
generate one or more commands to modify the one or more processes based on the second digital representation; and
send the one or more commands to at least a portion of the plurality of industrial automation devices, wherein the one or more commands are configured to cause the at least a portion of the plurality of industrial automation devices to modify one or more operational settings to cause a change to the one or more processes.

2. The computing device of claim 1, wherein the computing device comprises an edge computing device of the industrial automation system.

3. The computing device of claim 1, wherein the computing device is part of a drive of the industrial automation system.

4. The computing device of claim 1, wherein the processing circuitry is configured to:

transmit one or more identifiers of one or more industrial automation devices of the plurality of industrial automation devices and one or more data attributes of the OT data to a second computing device in response to determining that the one or more data attributes have one or more variations as compared to additional OT data;

receive, from the second computing device, one or more additional containers comprising one or more updated digital representations of the one or more industrial automation devices;

execute the one or more additional containers configured to output one or more additional data attributes; and send the one or more commands to the at least a portion of the plurality of industrial automation devices to cause the one or more processes to change based on the one or more additional data attributes.

5. The computing device of claim 4, wherein the processing circuitry is configured to:

determine the one or more identifiers of the one or more industrial automation devices based on the OT data; and determine that the OT data comprises the one or more data attributes having the one or more variations.

6. The computing device of claim 5, wherein the processing circuitry is configured to determine the one or more identifiers by retrieving one or more namespace elements associated with the one or more industrial automation devices via the OT data.

7. The computing device of claim 6, wherein the one or more namespace elements correspond to one or more model numbers, one or more serial numbers, one or more Media Access Control (MAC) addresses, or any combination thereof associated with the one or more industrial automation devices.

8. A method, comprising:

receiving, via a computing device, one or more containers configured to simulate a plurality of digital representations corresponding to a plurality of industrial automation devices of an industrial automation system;

receiving, via the computing device, operational technology (OT) data from the plurality of industrial automation devices, wherein a portion of the OT data comprises:

an identifier associated with a first industrial automation device of the plurality of industrial automation devices, wherein the identifier comprises an indication of a second industrial automation device of the plurality of industrial automation devices associated with the first industrial automation device;

simulating, using the one or more containers, a first digital representation of the plurality of digital representations corresponding to one or more simulated operations of the second industrial automation device at a device level based on an additional portion of the OT data associated with the second industrial automation device;

simulating, via the computing device and using the one or more containers, a second digital representation of the plurality of digital representations corresponding to one or more processes performed by the plurality of industrial automation devices at a system level to generate one or more simulated processes, wherein the second digital representation is simulated based on the OT data and the one or more simulated operations;

generating, via the computing device, one or more commands to modify the one or more processes based on the second digital representation; and sending, via the computing device, the one or more commands to at least a portion of the plurality of industrial automation devices, wherein the one or more commands are configured to cause the at least a portion of the plurality of industrial automation devices to modify one or more operational settings to cause a change to the one or more processes.

9. The method of claim 8, comprising, outputting, via the one or more containers, one or more data attributes of the OT data based on the one or more simulated operations.

10. The method of claim 8, wherein simulating the first digital representation and the second digital representation comprises using one or more mathematic models based on one or more machine learning or artificial intelligence algorithms.

11. The method of claim 8, comprising:

transmitting, via the computing device, one or more identifiers of one or more industrial automation devices of the plurality of industrial automation devices and one or more data attributes of the OT data to a second computing device in response to determining that the one or more data attributes have one or more variations as compared to additional OT data;

receiving, via the computing device, from the second computing device, one or more additional containers comprising one or more updated digital representations of the one or more industrial automation devices;

executing, via the computing device, the one or more additional containers configured to output one or more additional data attributes; and sending, via the computing device, the one or more commands to the at least a portion of the plurality of industrial automation devices to modify cause the one or more processes to change based on the one or more additional data attributes.

12. The method of claim 11, comprising determining, via the computing device, the one or more identifiers of the one or more industrial automation devices based on the OT data.

13. The method of claim 11, comprising determining, via the computing device, the OT data comprises the one or more data attributes having the one or more variations.

14. The method of claim 8, wherein receiving the one or more containers comprises receiving the one or more containers from a container registry via a subscription service provided by a container subscription component.

15. A non-transitory, computer-readable medium storing instructions that, when executed by processing circuitry, cause the processing circuitry to:

receive one or more containers configured to simulate a plurality of digital representations a plurality of industrial automation devices of an industrial automation system;

receive operational technology (OT) data from the plurality of industrial automation devices, wherein a portion of the OT data comprises:

an identifier associated with a first industrial automation device of the plurality of industrial automation devices, wherein the identifier comprises an indication of a second industrial automation device of the plurality of industrial automation devices associated with the first industrial automation device;

simulate, using the one or more containers, a first digital representation of the plurality of digital representations corresponding to one or more simulated operations of the second industrial automation device at a device level based on an additional portion of the OT data associated with the second industrial automation device;

simulate, using the one or more containers, a second digital representation of the plurality of digital representations corresponding to one or more processes performed by the plurality of industrial automation devices at a system level to generate one or more simulated processes, wherein the second digital representation is simulated based on the OT data and the one or more simulated operations; and generate one or more commands to modify the one or more processes based on the second digital representation; and send the one or more commands to at least a portion of the plurality of industrial automation devices, wherein the one or more commands are configured to cause the at least a portion of the plurality of industrial automation devices to modify one or more operational settings to cause a change to the one or more processes.

16. The non-transitory, computer-readable medium of claim 15, wherein the instructions, when executed, cause the processing circuitry to:

transmit one or more identifiers of one or more industrial automation devices of the plurality of industrial automation devices and one or more data attributes of the OT data to a second computing device in response to determining that the one or more data attributes have one or more variations as compared to additional OT data;

receive, from the second computing device, one or more additional containers comprising one or more updated digital representations of the one or more industrial automation devices; and execute the one or more additional containers configured to output one or more additional data attributes.

17. The non-transitory, computer-readable medium of claim 16, wherein the instructions, when executed, cause the processing circuitry to send the one or more commands to the at least a portion of the plurality of industrial automation devices to modify cause the one or more processes to change based on the one or more additional data attributes.

18. The non-transitory, computer-readable medium of claim 16, wherein the one or more updated digital representations are configured to convert the OT data into formatted data based on hierarchical information of the industrial automation system and a predetermined data structure, wherein the formatted data enables sharing the formatted data within the one or more updated digital representations.

* * * * *